Jan. 7, 1969

R. E. TEAGLE 3,420,442

ENGINE EXHAUST CONTROLLER

Filed Dec. 28, 1966

INVENTOR.
RICHARD E. TEAGLE

BY Jack N. McCarthy

AGENT fig. 14 fig. 9 fig. 10 fig. 12 fig. 13

United States Patent Office 3,420,442
Patented Jan. 7, 1969

3,420,442
ENGINE EXHAUST CONTROLLER
Richard E. Teagle, North Palm Beach, Fla., assignor, by mesne asignments, to the United States of America as represented by the Administrator of the Federal Aviation Administration
Filed Dec. 28, 1966, Ser. No. 605,453
U.S. Cl. 239—127.3                    9 Claims
Int. Cl. B64d 33/04

ABSTRACT OF THE DISCLOSURE

An engine exhaust controller for receiving the gas flow from an engine and coordinating exhaust nozzle position for forward flight and redirection of exhaust gases for reversal thrust. A mechanical arrangement consisting of aerodynamically operated free floating blow-in doors synchronized to the "clam shell" sections such that movement of the blow-in doors repositions the "clam shell" sections to provide a maximum supersonic and subsonic aircraft performance.

---

This invention relates to the control of engine exhaust and coordinates exhaust nozzle positions for forward flight and reverser action for stopping.

It is an object of this invention to control expansion of mixed stream exhaust gases for maximum performance in forward flight.

It is another object of this invention to provide for redirection of exhaust gases for reversing thrust.

It is a further object of this invention to provide for positioning the "clamshell" reverser sections between aircraft "subsonic" and "supersonic" flight to achieve the greatest noise suppression.

It is another object of this invention to provide an aerodynamically actuated system in forward flight while retaining pilot control during reversal.

It is a further object of this invention to provide a mechanical arrangement whereby the movement of the blow-in doors repositions the "clamshell" sections to provide the optimum condition of engine performance and noise suppression.

It is another object of this invention to provide a pilot controlled interlock so that only the pilot can move the "clamshell" sections into position to provide for reversal with said movement repositioning the blow-in doors to an optimum position for reversal.

It is a further object of this invention to provide blow-in doors of two sections to provide for proper lead-in angle of the ramp for various conditions of engine operation.

It is another object of this invention to synchronize the movement of all of the blow-in doors so that they open and close in a like manner.

Other objects and advantages will be apparent from the specification and claims and from the accompanying drawings which illustrate an embodiment of the invention.

Figure 1:
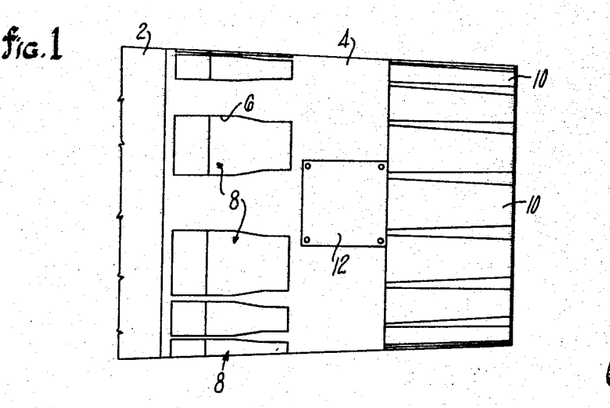
FIGURE 1 is a side view showing the rear section of an engine having blow-in doors and trailing edge flaps.

As shown in FIGURE 1, the rear portion of the engine nacelle 2 has a rearwardly extending annular support framework 4 which has cutouts 6 for blow-in doors 8 and trailing edge exit flaps 10 which form the discharge portion of the ejector nozzle. This support framework 4 also supports on each side the mechanism for pivoting the "clamshell" sections which are accessible through a plate 12 on each side of the structure.

To provide the proper control of engine exhaust in this disclosure, the arrangement provides for five major sections: (1) the main structure which includes the support farmework 4, (2) the blow-in doors 8 which are set in the forward part of the framework 4, (3) the interior contour 13 of the framework with "clamshell" sections which form the ejector throat, (4) "clamshell" sections 14 which form a movable portion of the ejector throat which can be variably positioned between supersonic and subsonic aircraft flight, and which also provide exhaust gas blockage for reverse thrust, and (5) exit flaps (tail feathers) 10 which, as stated hereinbefore, form the discharge portion of the ejector nozzle.

Each blow-in door is formed having a forward part 9 and rearward part 11. The forward part 9 of each of the blow-in doors is pivotally attached to the framework 4 at two locations, one adjacent each side. At each location, a bracket is attached to the part 9 having a single forwardly extending lever 60 which has its free end pivoted to a bifurcated bracket 62 which extends rearwardly from the framework 4. The rearward end of the part 9 is pivotally attached to the forward end of part 11 by mating brackets at each side of the blow-in door forming mid-hinges. A bracket having a single extending lever 64 is attached to each rearward end of the forward part 9 and a bracket having a bifurcated receiving member 66 is attached to each side of the forward end of the rear part 11. The end of each lever 64 and its bifurcated receiving member 66 are pivoted together so that a short shaft extends toward the outer edge of the blow-in door permitting a roller 68 to be rotatably mounted thereon for a purpose to be hereinafter described.

In the configuration shown in this disclosure, see FIG. 1, the cutout 6 is formed having a forward straight section which tapers inwardly to a narrow rear part. The two parts of the blow-in door are so sized to fit this opening when in a closed position. Adjacent the forward end of the narrow part of each blow-in door, a short lever 70 extends inwardly on each side. An adjustable link 71 is pivotally connected at one end to the free end of each lever 70 and pivotally connected at the other end to the cooperating end 37 of adjacent link 30.

To provide for proper coordination of movement between the blow-in doors 8 and "clamshell" sections 14, interconnecting and actuating mechanisms are included. The exit flaps 10 are free floating having limited inward and outward movement. A first mechanism is incorporated which synchronizes the movement of the blow-in doors 8, one to the other during their movement between a fully closed position and a fully opened position. An I-beam member 20 is positioned lengthwise adjacent each edge of the wide part of the cutouts 6 and extends from an annular rib 22 at the forward part of framework 4 to a point aft of the rear end of the cutouts 6. Where two blow-in doors have cutouts placed relatively close to each other, one member 20 is used for both doors, where the support framework 4 has a relatively large surface area between adjacent cutouts 6, two members 20 are placed with one adjacent each side of the adjacent cutouts.

Each I-beam member 20 has a translating link 30 mounted on each side thereof for axial movement together. Each link 30 adjacent a cutout is formed having a curved cam section 32 intermediate the ends thereof with the cam section including an open channel 34 which faces the cutout 6 on the side of the I-beam on which the link 30 is located. Each open channel 34 receives a roller 68 of the blow-in door to control the positioning of the mid-point in accordance with cam shape. A flat portion 36 extends rearwardly from said cam section 32 and a flat section 38 extends forwardly thereof. The rearward end of portion 36 contains a bifurcated tip 37 which is rigidly fixed thereto and the free end of the forward end includes a bifurcated tip 39 which is adjustably fixed thereto so that the length of the link 30 can be adjusted. This adjustable feature is made possible by the well-known use of a threadable connection with a lock nut. Each link 30 adjacent a solid portion of the framework 4 is made as a straight link without the cam section 32 (see FIG. 2).

Figure 7:
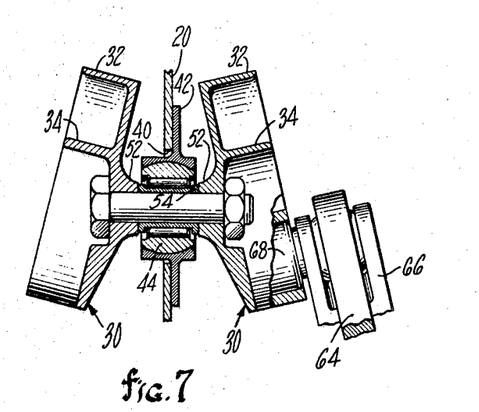
FIGURE 7 is an enlarged view taken along the line 7—7 of FIGURE 3.
Figure 8:
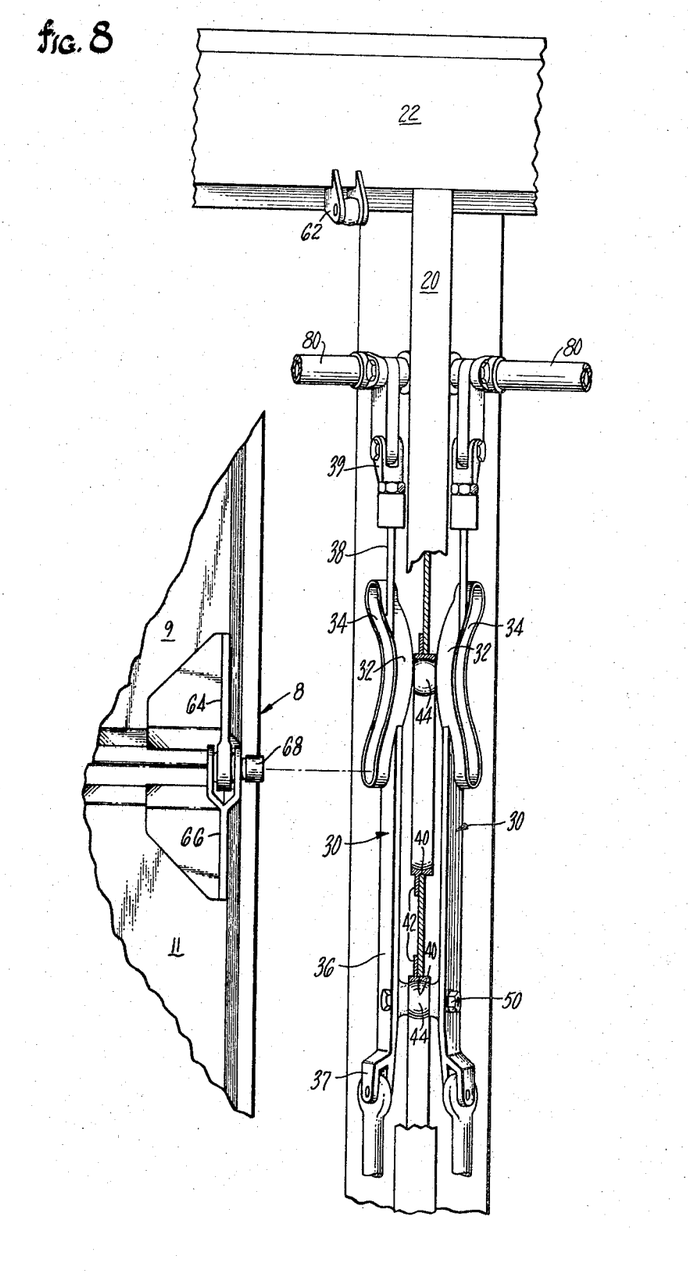
FIGURE 8 is an enlarged view showing the synchronizing means between adjacent blow-in doors.

The links 30 on each side of each I-beam member 20 are interconnected to move lengthwise together. This is done by locating two longitudinal slots 40 through the center of the I-beam member. To lengthen the life of these units, an insert 42 of greater width is placed in each of the openings and fixed to the I-beam member 20. The insert members 42 are contoured to receive a ball-shaped member 44 (see FIG. 7). Cooperating links 30 mounted on an I-beam member 20 are interconnected at two points by bolts 50 which extend through bosses 52 which have their free ends abutting a spacer 54 on which the ball-shaped member 44 can rotate on bearing means.

Figure 6:
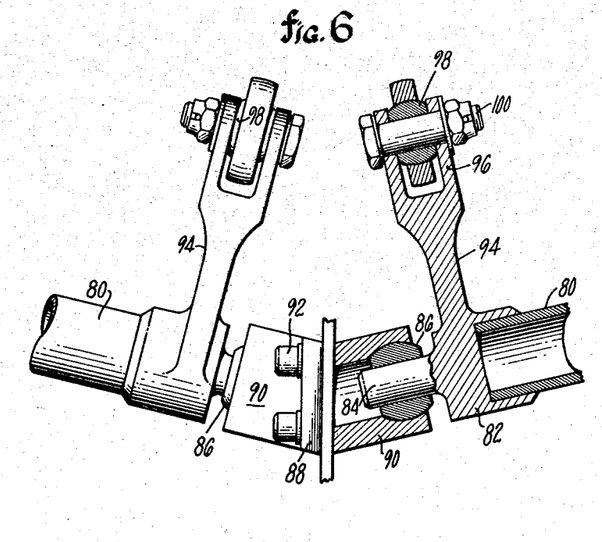
FIGURE 6 is an enlarged view taken along the line 6—6 of FIGURE 3.

The links 30 of adjacent links on adjacent I-beam members 20 are interconnected to move lengthwise together. Between the forward end of each I-beam member 20 a tube 80 is mounted for rotation. These tubes 80 are all located in the same transverse plane. Each end of each tube 80 is fixedly mounted in a recess of a boss 82 (see FIG. 6). The boss 82 has a shaft member 84 extending therefrom on which a ball member 86 is positioned. Each ball member 86 is mounted in the boss 90 of a bracket 88. Each pair of brackets 88 can be fixed to its cooperating I-beam member 20 by bolts 92 or any other known holding means. Each boss 82 has a lever 94 extending therefrom having a bifurcated end 96. This bifurcated end 96 has a ball member 98 held in position between the times of the bifurcated member. This ball can be held by bolts such as 100. A lever 102 is connected between the ball 98 of each lever 94 and the bifurcated tip 39 of the cooperating link 30 on the same side of the I-beam member 20.

It can be seen that the movement of the links between I-beam members 20 will be synchronized by the links 102, levers 94 and tubes 80. The lever 94 on each end of each tube will, of necessity, move together.

Figure 9:
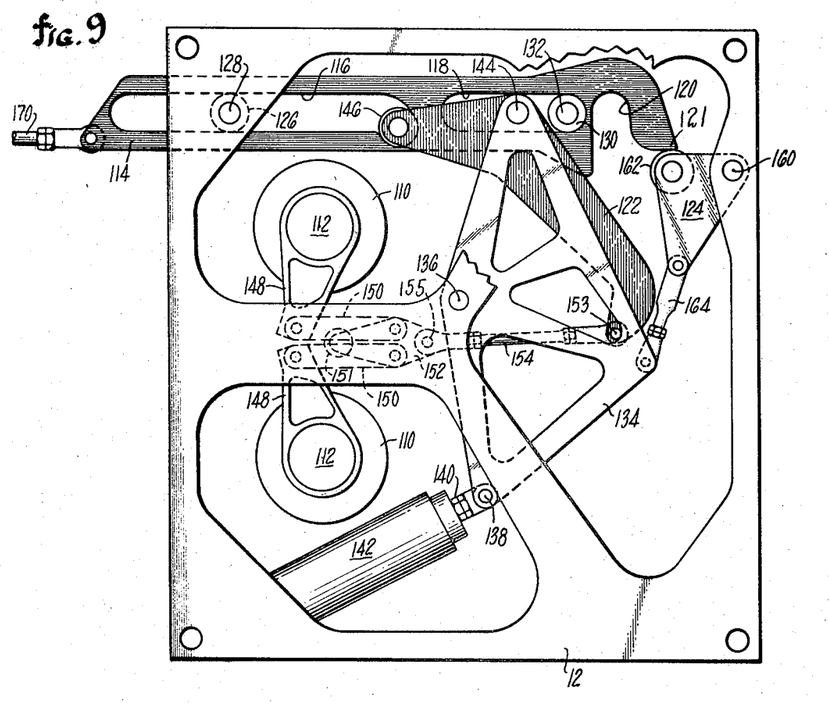
FIGURE 9 is an enlarged view showing the pivotal support for the "clamshell" sections and the mechanism to coordinate their movement; the position of the mechanism is for supersonic flight of an aircraft.

A second system is incorporated which synchronizes the movement of each of the "clamshell" sections with each other and with the blow-in doors 8 (see FIG. 9). This system has two mechanisms generally located at two positions, that is one each at the location of the hinges of the "clamshell" sections on each side of the engine, between the plate 12 of the support framework 4 and the inner surface 13 of the framework. Plate 12 is shown with large cutout sections so that the mechanism can be more clearly seen. While the plate 12 and surface 13 have been shown mounting these mechanisms, separate supporting plates could be used with the unit being fixed to the framework and made removable as a unit. The inner surface 13 on each side is formed to receive the mechanism and has two bosses 110 in which are pivotally mounted short pivotal shafts 112 of the "clamshell" sections. Each of these mechanisms includes a shuttle beam 114 which contains three roller cam tracks, or guides, 116, 118 and 120. The forward cam track 116 serves as both a shuttle beam guide and cam track for a "clamshell" positioner lever 122. The cam track 116 extends longitudinally of the engine with a short section of the rearward end curved downwardly at 117. The mid-track serves as a shuttle beam guide only and extends longitudinally in the same manner as the main part of cam track 116. The rear cam track 120, which extends perpendicular to the other two tracks, serves as a shuttle beam stop and cam track for the interlock lever means 124.

Fixed pins are mounted between the inner surface 13 and the inside of plate 12 to support and guide each shuttle beam 114. A roller 126 is mounted on pin 128 and positioned within cam track 116 and a roller 130 is mounted on pin 132 and positioned within cam track 118. The length of the cam track 118 limits the longitudinal movement of each shuttle beam 114.

A compound reverser lever means 134 is formed of two plates which are shaped as a trapezium and fixedly mounted a distance apart. One corner is pivotally mounted on a pin 136 fixed between the cover 12 and inner surface 13. One corner adjacent the pivotal corner mounted on pin 136 is attached by a pin 138 to the free end of a piston rod 140 which has its piston mounted in a cylinder 142. Cylinder 142 is pivotally mounted to the structure to permit extension of the piston rod by fluid controls, not shown. The other corner adjacent the pivotal corner mounted on pin 136 is pivotally attached by a pin 144 to a mid-point of a "clamshell" positioner lever 122. This portion of the positioner lever 122 is bifurcated and is so constructed to one end of the lever forming a bifurcated arm to fit around the shuttle beam 114. The bifurcated end of this arm of lever 122 contains a roller 146 at its extreme end which is pivotally mounted thereto and which rides in the forward cam track 116. Another arm of the "clamshell" positioner lever 122 has its free end located approximately on a line passing longitudinally between the short pivotal shafts 112 of the "clamshell" sections.

Each of the short pivotal shafts of the "clamshell" sections has a short lever 148 extending therefrom. The free end of each lever 148 has the end of a link 150 attached thereto. The other ends of the links 150 are pivotally attached adjacent each other on a transverse line to a single actuating member 152. This single actuating member 152 has a forward projection having roller means 151 thereon. This roller means is guided in cams or tracks positioned along the inner surface of the plate 12 and surface 13. The movement is along a straight longitudinal line. This member has rearwardly extending portion which is connected to the free end of the free arm of positioner lever 122 by and adustable link 154. One end of link 154 is pivotally connected to the member 152 by a pin 155 and the other end of link 154 is pivotally connected to the positioner lever 122 by a pin 153.

The interlock lever means 124 is formed of two plates which are triangular in shape and fixedly mounted a distance apart. The distance permits the width of the shuttle beam 114 at that point to pass therethrough. One corner is pivotally mounted on a pin 160 fixed between the plate 12 and inner surface 13. One adjacent corner has a roller 162 mounted thereon between said plates for a purpose to be hereinafter described. The remaining corner is connected by an adjustable link 164 to the remaining corner of the reverser lever means 134 so that movement of the reverser lever means 134 will actuate the interlock lever means 124 and rotate it about the pin 160. The adjustable links in this mechanism are used to allow for difference in size, parts mand, as disclosed, do not adjust automatically in flight.

Figure 2:
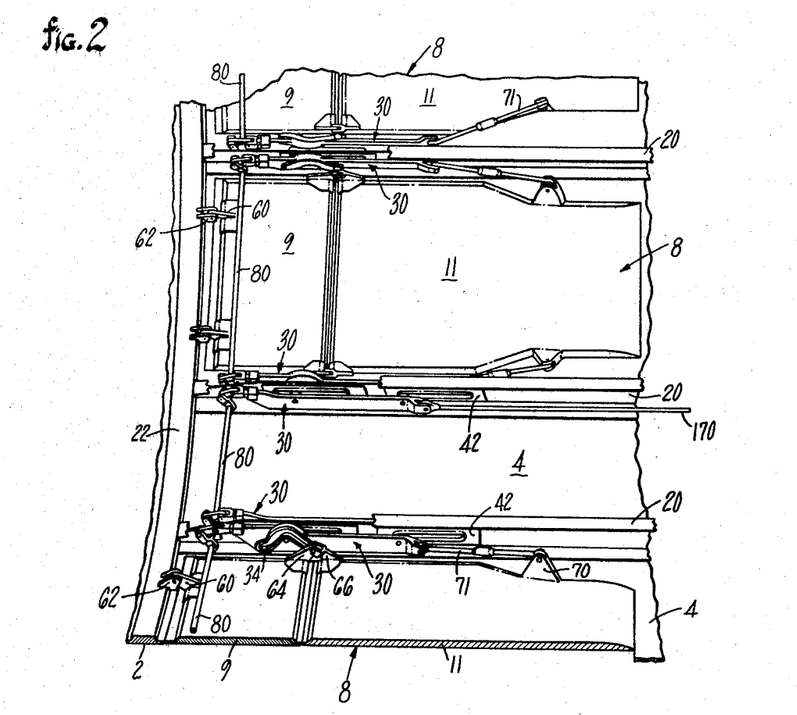
FIGURE 2 is a perspective view of a section of the interior of the blow-in door part of FIGURE 1.

To interconnect the first mechanism which comprises the links 30 and their interconnecting parts with the second system which incorporates the two mechanisms for controlling "clamshell" section movement, two adjustable links 170 extend between the forward part of each shuttle beam 114 and the rear end of an aligned link 30 (see FIGS. 2 and 9). In the construction shown, each shuttle beam 114 happens to be in line with a flat link 30. It can be seen now that the movement of links 30 and shuttle beams 114 will be synchronized in their fore-and-aft movement. The links 170 are also made adjustable in length.

Figure 12:
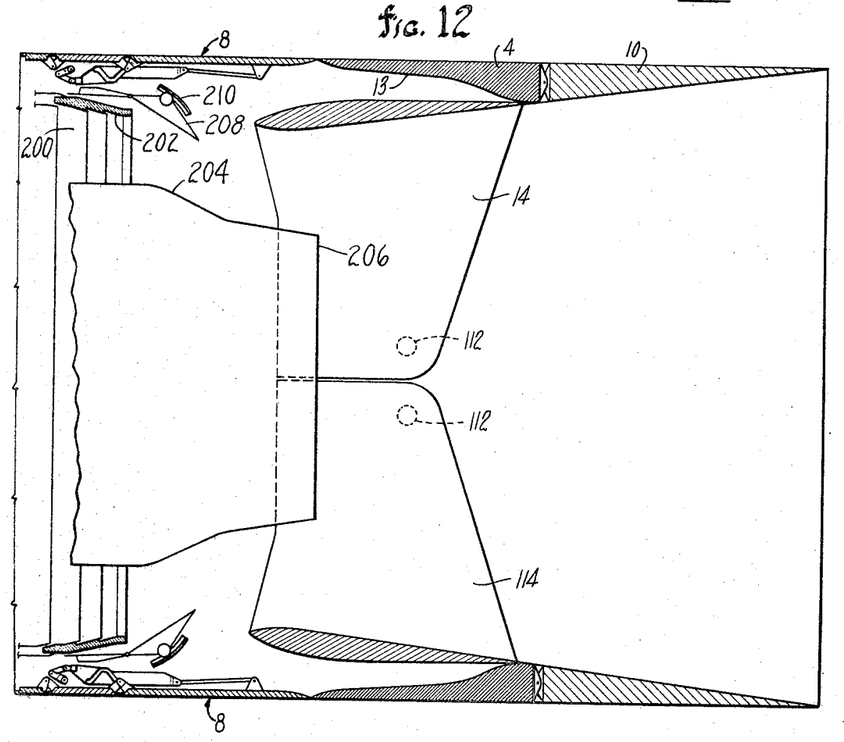
FIGURE 12 is a schematic view showing the position of the "clamshell" sections with relation to the remainder of the engine for supersonic flight of an aircraft.

FIGURE 12 shows the incorporation of applicant's device on an engine of a type wherein an annular duct extending rearwardly from the fan of a fan engine includes a duct burner wherein heat is added to the bypass air for increasing augmentation of the stream. An engine of this type has two primary gas flows, one from the conventional jet engine and one from the surrounding annular duct burner. The engine shown has an annular duct 200 formed by an outer wall 202 and an inner wall 204. The inner wall 204 extends around a jet engine or gas generator having an exhaust duct 206. Adjustable flaps 208 are located about the end of the annular duct 200 and are moved along a track mechanism 210 by an actuator, not shown. This engine construction is further disclosed in an application being filed herewith on "Jet Sound Suppressing Means" by Chandos E. Langston, Jr. The conventional engine may be of the type disclosed more fully in U.S. Patent No. 2,747,367. While the exhaust nozzle is shown of a particular design of movable flaps, the construction as shown in U.S. Patents Nos. 3,062,003; 2,815,643 and 2,836,034 should be noted.

*Operation*

Figure 3:
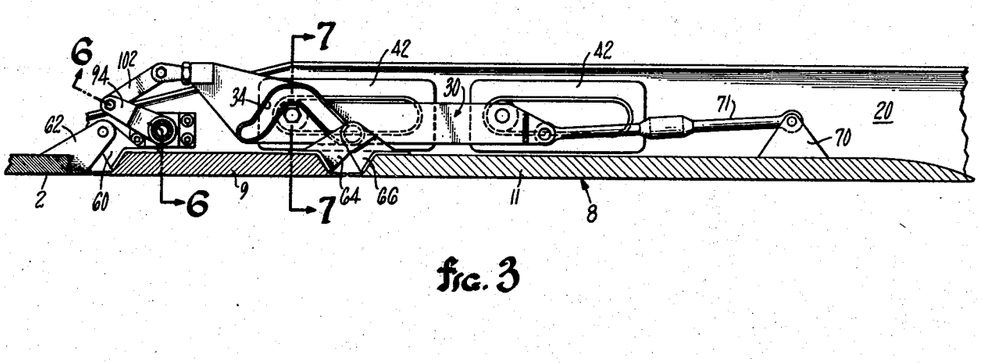
FIGURE 3 is an enlarged view of the pivotal connection of the blow-in door to the support framework of the engine along with the mechanism to control positioning of each section of the blow-in door with the other during various stages of engine operation; the position of the two parts of the blow-in door is for supersonic flight of an aircraft.

In FIGURE 1, the blow-in doors 8 are viewed from the exterior of the device when they are in their closed position, such as they are shown in FIGURES 2 and 3. In this position, all of the blow-in doors are closed and the rollers 44 of each link 30 are positioned against the forward end of the slots of the inserts 42 and the rollers 68 of the blow-in doors are positioned at the rearward end of the cams 32.

When the blow-in doors 8 are in their closed position, the "clamshell" sections 14 are positioned so that they form an effective diverging nozzle extending to a point adjacent the rear end of the framework 4. The free floating flaps 10 are positioned so that they continue the diverging nozzle rearwardly of the "clamshell" sections 14. This relationship of the blow-in doors 8, "clamshell" sections 14 and flaps 10 can be viewed in FIGURE 12.

When the pressure acting on the inside of the blow-in doors 8 falls below the pressure acting on the outer side, the blow-in doors 8 start to move inwardly. As the doors move inwardly, they move towards the position in FIGURE 4. With the sliding links 30 being pulled rearwardly by the links 71, each link 30 is interconnected to move together. The pressure difference on all of the blow-in doors tends to move all of the doors to a resultant-like position.

Figure 4:
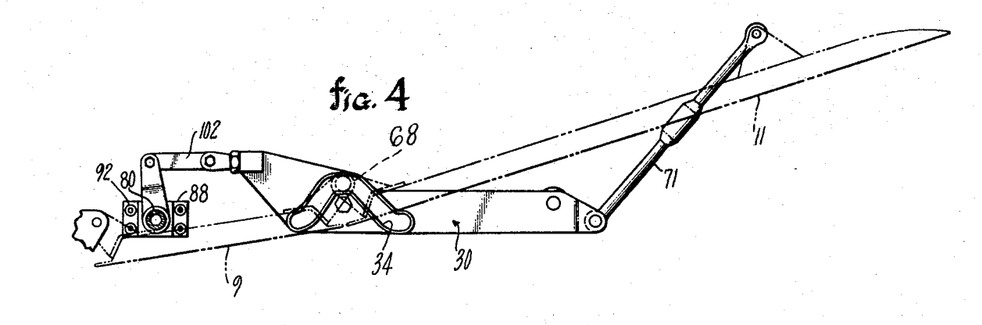
FIGURE 4 is a view similar to FIGURE 3 showing the position of the blow-in door for subsonic flight of an aircraft.

As the blow-in doors 8 are moved from their closed position towards their free floating open position, as shown in FIGURE 4, the rollers 44 of each link 30 are moved towards a position midway in the slots of the inserts 42 and the rollers 68 of the blow-in doors are positioned somewhere between the rearward end of the cam 32 and the top of the raised portion.

Figure 10:
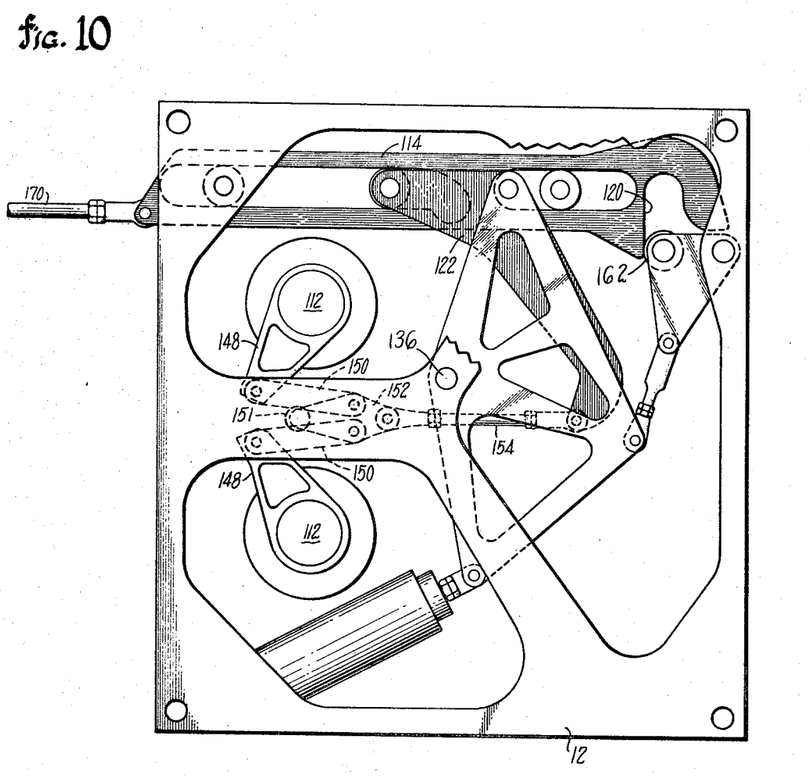
FIGURE 10 is a view similar to FIGURE 9 showing the position of the mechanism for subsonic flight of an aircraft.
Figure 13:
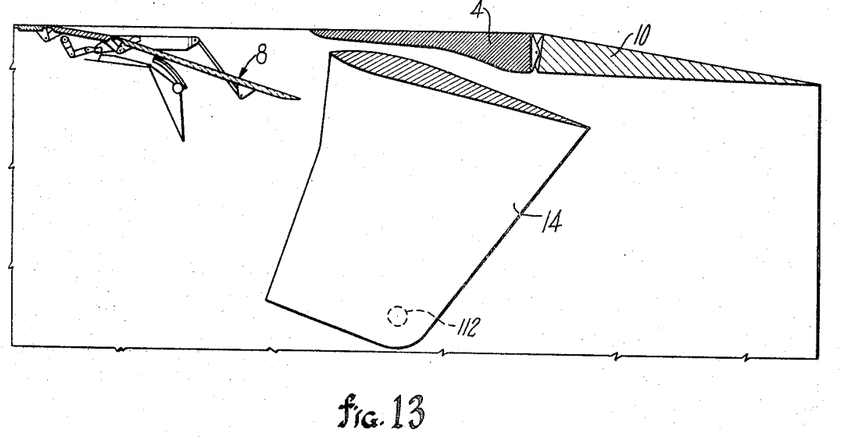
FIGURE 13 is a schematic view showing the position of the "clamshell" sections with relation to the remainder of the engine for subsonic flight of an aircraft.

The pressure differential acting on the blow-in doors 8 is permitted to move the blow-in doors between the positions shown in FIGURES 3 and 4. It is stopped at the position shown in FIGURE 4 when the two rods 170 move their respective shuttle beams 114 rearwardly until the forward surfaces of the cam tracks 120 strike the rollers 162 of the interlock lever means 124. This meeting of the cam and roller is shown in FIGURE 10. It can be seen in FIGURE 13 that when the blow-in doors 8 are positioned as shown in FIGURE 4, the "clamshells" have assumed a position wherein they form an effective converging nozzle and the free floating flaps 10 have also assumed their innermost position. While the flaps 10 are free floating, the "clamshell" sections 14 are controlled by the blow-in doors 8 in their free floating range.

As the blow-in doors start to move inwardly, the rods 170 start moving the shuttle beams 114 to the rear and, as stated before, will do so until the forward part of cam tracks 120 hits rollers 162. However, during the first movement of this shuttle beam 114, the roller 146 of the "clamshell" positioner lever 122 is cammed upwardly from the bottom of the curved part of the rear of the cam track 116. When the roller 146 of the "clamshell" positioner lever 122 moves from its position at the rearward end of cam track 116 to the straight portion of the cam track, the lower end of the "clamshell" positioner lever 122 moves through the toggle linkage to rotate the levers 148 forwardly to rotate the pivotal shafts 112 of the "clamshell" sections thereby moving them from the position shown in FIGURE 12 to the position shown in FIGURE 13; that is, from a diverging position to a converging position. It can be seen that the movement takes part during the beginning of the opening of the blow-in doors and at the last part of the closing. While the blow-in doors 8 are permitted to free float for a given range and actuate the "clamshell" sections, the control means for the cylinder 142 which directs fluid therethrough to position the piston rod 140 remains inactive with the piston rod located within the cylinder as shown in FIGURES 9 and 10. While the cylinder 142 and piston rod 140 are in this position, the compound reverser lever means 134, adjustable link 164, and interlock lever means 125 maintain a fixed position.

Figure 11:
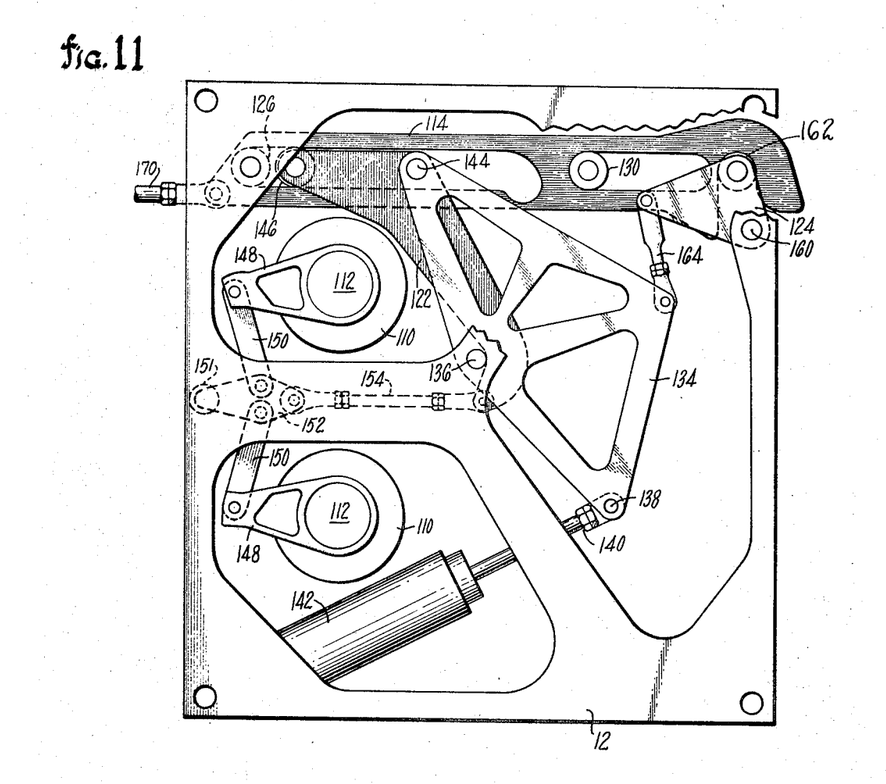
FIGURE 11 is a view similar to FIGURE 9 showing the position of the mechanism for reversal of exhaust flow during landing of an aircraft.
Figure 14:
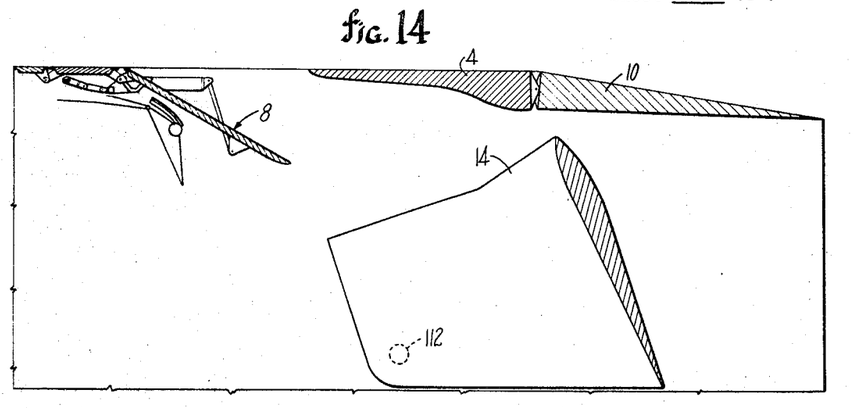
FIGURE 14 is a schematic view showing the position of the "clamshell" sections with relation to the remainder of the engine for reversal of exhaust flow during landing of an aircraft.

When it is desired to obtain a reversing action of the exhaust gases flowing from the engine, the pilot will actuate the control for the cylinder 142 and an actuating fluid will move piston rod 140 rearwardly and pivot the compound reverser lever means 134 counterclockwise about pin 136. This action will move the "clamshell" positioner lever 122 forwardly through pin 144 with the roller 146 being guided in cam track 116. The other end of the "clamshell" positioner lever 122 rotates the "clamshells" to their reverser position as shown in FIGURE 14 through link 154, guided actuating member 152, links 150 and levers 148. Also moving with the compound reverser lever means 134 is the interlock lever means 124 whose roller 162 is forced upwardly in cam track 120 and moves the shuttle beam 114 to the rear to its rearwardmost position as shown in FIGURE 11. In this position, the rollers 130 and 126 are positioned against the forward end of their respective cam tracks. It will be noted that inadvertent actuation of the reverse system cannot occur since the rearward end 121 of the shuttle beam 114 blocks movement of the roller 162 until the blow-in doors have made an initial move inwardly.

Figure 5:
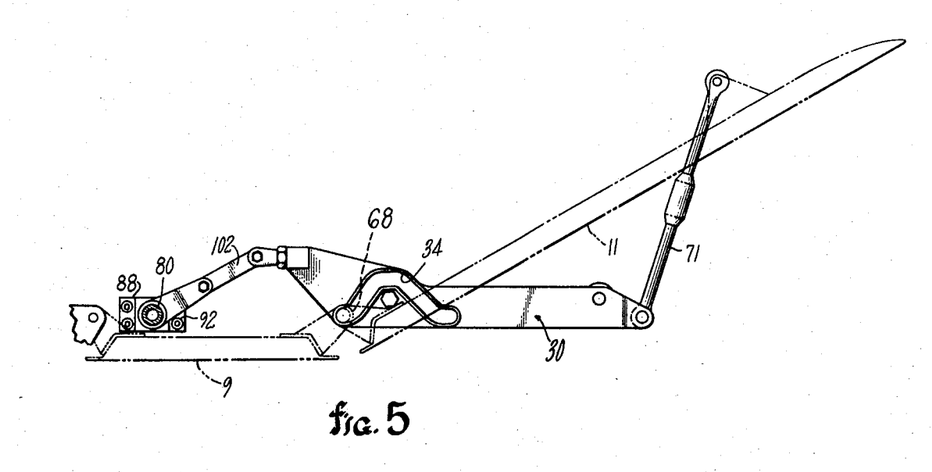
FIGURE 5 is a view similar to FIGURE 3 showing the position of the blow-in door for reversal of exhaust flow during landing of an aircraft.

When thrust reversal is placed into effect and while the movements just referred to are taking place, the movement of the shuttle beam 114 is transferred to the blow-in doors by the links 170 and links 30. The blow-in doors are no longer free floating but are moved through action of the cylinder 142 and piston rod 140. This further movement of the links 30 to the rear moves the rollers 44 of each link 30 to a position against the rearward end of the slots of the inserts 42 and the rollers 68 of the blow-in doors are positioned at the forward end of the cams 32. This movement positions the blow-in doors as shown in FIGURE 5, and the relationship of the blow-in doors and the "clamshell" sections 14 are shown in FIGURE 14. This arrangement directs the exhaust flow through the portion of each cutout which is open. Action of all of the mechanisms is reversible.

It is noted that the interlock lever means 124 serves three functions, (1) as a stop for the shuttle beams 114 during forward flight, (2) as a lockout for thrust reversal at supersonic flight, and (3) as an aid to reverser actuation by action of blow-in doors through shuttle beams 114.

I claim:
1. An engine exhaust controller for receiving the gas flow from an engine, including:
   (a) a circular duct having cutouts adjacent to the forward parts thereof adapted to receive the exhaust flow,
   (b) said rearward part of said duct having a pair of "clam shell" sections mounted therein for pivotal movement,
   (c) said "clam shell" sections being movable between a position forming an effective divergent nozzle and a position forming an effective convergent nozzle,
   (d) said cutouts having blow-in doors located therein and pivoted at their forward ends,
   (e) said blow-in doors being formed of a forward and rearward section,
   (f) said blow-in doors opening and closing movement being programmed by a cam and link arrangement whereby the angular position of each section of a blow-in door is properly positioned during engine operation,
   (g) means coordinating movements of said blow-in doors and "clam shell" sections so that when said blow-in doors are closed said "clam shells" form an effective divergent nozzle and when said blow-in doors are moved inwardly about their forward pivots, the "clam shell" sections are moved to a position forming an effective convergent nozzle,
   (h) said coordinating means including a connection between said blow-in doors and said "clamshell" sections,
   (i) said connection including a plurality of translating links movable by said blow-in doors,
   (j) said translating links also being connected to said "clamshell" sections.
2. An engine exhaust controller as set forth in claim 1 wherein:
   (g) said "clamshell" sections can be moved to a position directing exhaust flow forwardly through said cutouts.
3. A combination as set forth in claim 1 wherein:
   (g) said "clamshell" sections being also movable into a position for diverting a gas flow entering said circular duct outwardly therefrom for thrust reversal,
   (h) said coordinating means including means for actuating said "clamshell" sections into their thrust reversal position while repositioning said blow-in doors to an optimum inward position.
4. A combination as set forth in claim 1 wherein:
   (g) said coordinating means including means interconnecting said blow-in doors for synchronized movement therebetween.
5. A combination as set forth in claim 1 wherein:
   (g) said blow-in doors are free floating during forward flight and move between limits from a fully closed to an open position with this free floating movement actuating the "clamshell" sections.
6. A combination as set forth in claim 1 wherein:
   (g) said coordinating means including guide means on each side of each cutout,
   (h) a translating link mounted in each guide means,
   (i) means connecting each blow-in door to the translating link adjacent each side thereof,
   (j) means connecting each "clamshell" section to a translating link for movement therewith.
7. A combination as set forth in claim 5 wherein:
   (h) said "clamshell" sections being movable into a position for directing a gas flow entering said circular duct outwardly therefrom for thrust reversal,
   (i) means fo actuating said "clamshell" sections separately from said blow-in doors to move them to the position for thrust reversal.
8. A combination as set forth in claim 6 wherein:
   (k) said means connecting each "clamshell" section to a translating link including means for limiting the movement of said blow-in doors.
9. A combination as set forth in claim 7 wherein:
   (k) said coordinating means having means for preventing movement of the "clamshell" sections into their thrust reversal position when the blow-in doors are in a closed position.

References Cited
UNITED STATES PATENTS

| | | | |
|---|---|---|---|
| 3,048,973 | 8/1962 | Benedict | 239—127.3 |
| 3,062,003 | 11/1962 | Hamilton | 239—127.3 |
| 3,302,889 | 2/1967 | Di Sabato | 239—265.39 X |

M. HENSON WOOD, JR., *Primary Examiner.*

H. NATTER, *Assistant Examiner.*

U.S. Cl. X.R.

239—265.17, 265.41